Nov. 18, 1958     V. W. PETERSON     2,860,713

POWER TRANSMISSION SYSTEM

Filed Oct. 9, 1952     4 Sheets-Sheet 1

Inventor
Victor W. Peterson
By Willits, Helmig & Baillio
Attorneys

Nov. 18, 1958 V. W. PETERSON 2,860,713
POWER TRANSMISSION SYSTEM
Filed Oct. 9, 1952 4 Sheets-Sheet 3

Inventor
*Victor W. Peterson*
By
*Willis, Helwig & Bailho*
Attorneys

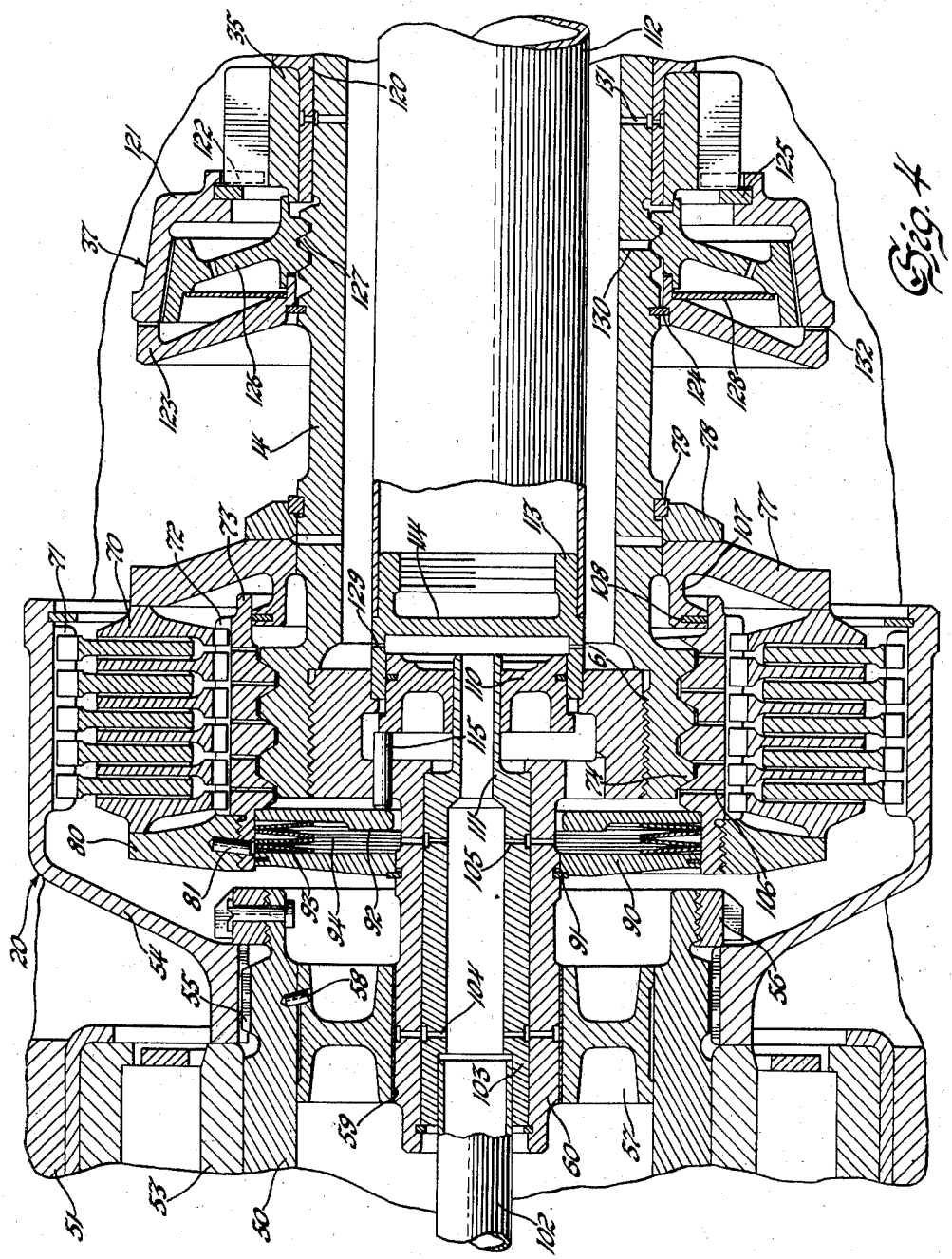

United States Patent Office 2,860,713
Patented Nov. 18, 1958

2,860,713

POWER TRANSMISSION SYSTEM

Victor W. Peterson, Indianapolis, Ind., assignor to General Motors Corporation, Detroit, Mich., a corporation of Delaware Application October 9, 1952, Serial No. 313,960

28 Claims. (Cl. 170—135.75)

This invention relates to power plants and more particularly to the transmission of power between an aircraft engine or engines and a propeller.

The invention is particularly applicable to aircraft power plant arrangements wherein a plurality of gas turbine engines of comparable power are coupled by clutches to a common propeller or propellers although the principles of the invention may also be applied to single engine arrangements and to the transmission of power in many fields other than the field of aircraft propulsion. Multiple engine power plant arrangements are especially useful in aeronautics as best efficiencies during some flight conditions are obtained with one or more of the engines uncoupled and inoperative. Multiple engine arrangements are inherently safer than single engine arrangements and are therefore preferred for some types of aircraft operation.

When two gas turbine engines of comparable power are each clutched to a common propeller or propellers and there is a failure in one of the engines, it is essential that the failed engine be rapidly declutched to free the other engine. If the failed engine is allowed to remain coupled to the propeller, the failed engine will ordinarily absorb power from the propeller in addition to absorbing the entire output of the good engine. Under these conditions, the propeller moves into low pitch in an effort to maintain speed and it absorbs power from the forward motion of the aircraft to help drive the failed engine. The resulting drag on the aircraft is likely to cause the pilot to lose control before he can declutch the failed engine. The drag resulting from a failed gas turbine engine is tenfold that of a comparable piston engine and the failure of a gas turbine, unlike the failure of a piston engine, is difficult to detect on the normal engine supervisory instruments that are furnished to the pilot.

The invention is described herein in terms of its preferred embodiment in an aircraft power plant comprising a pair of engine shafts connecting jointly or severally with a common propeller shaft through clutches that automatically engage or disengage in response to torque variations in the shafts. The power plant includes braking apparatus that prevents rotation of the propellers while the engines are inoperative and starting apparatus common to both engines to release the braking apparatus.

The principal objects of the invention are to provide an improved power plant of the turboprop type, particularly one with multiple engines; to provide improved clutching, braking, and starting arrangements for such power plants; and to provide improved clutches and brakes particularly suited for the type of application described above.

Further objects and advantages of the present invention will be apparent from the following description, reference being had to the accompanying drawings wherein a preferred form of the present invention is clearly shown.

In the drawings:

Fig. 4 is an enlarged view of the clutching mechanisms of Fig. 2.

Figure 1:
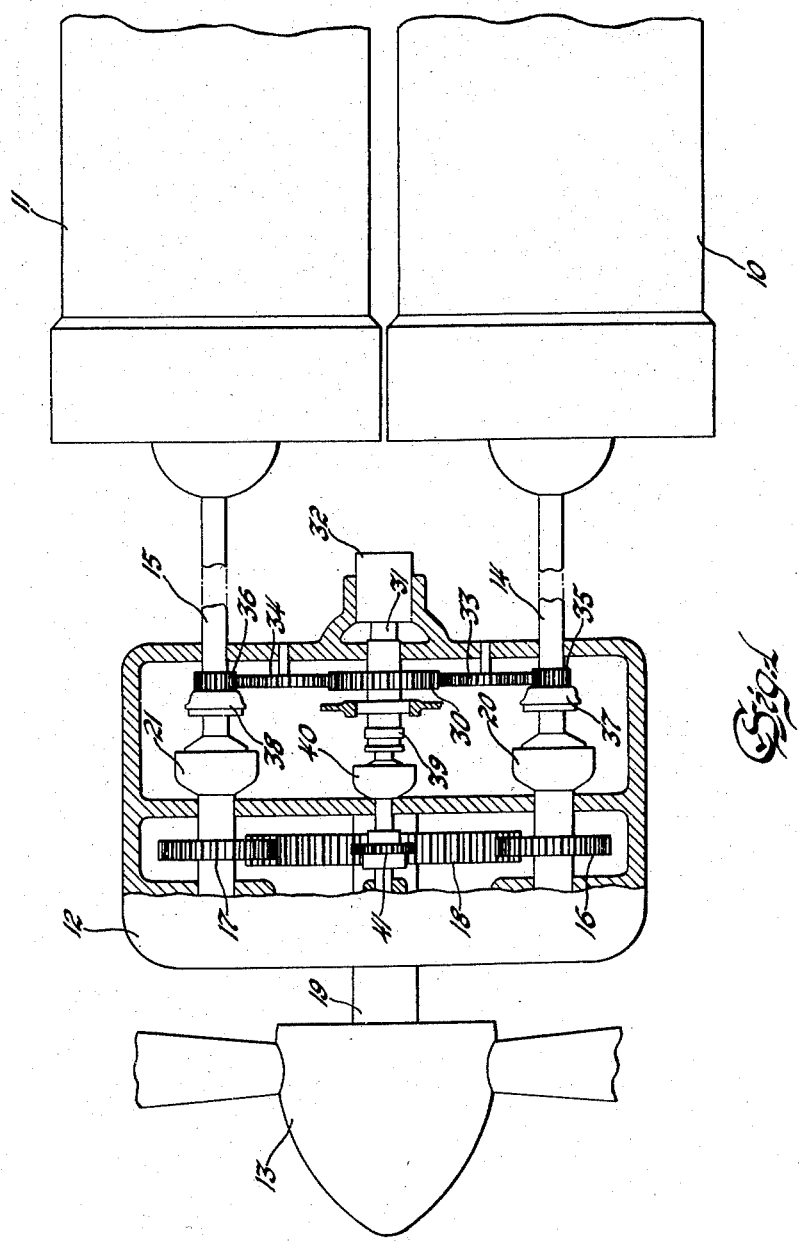
Fig. 1 is a schematic representation of a power plant incorporating the invention.

Referring now to the drawings in detail and more particularly to Fig. 1, the left and right gas turbine engines 10 and 11 are connected by a reduction gear transmission 12 to drive the common variable pitch propeller 13. Each of the engines is of a known type comprising a turbine to power the propeller, a combustor to deliver hot gases to the turbine to drive the same, and a compressor driven by the turbine to deliver air to the combustor for fuel admixture and combustion. The invention is directed to the unique means for transmission of power between the engines and the propeller; and since the engines and propeller are preferably of known type and design, only the structural details of the transmission are illustrated.

The left and right power input shafts 14 and 15 of the transmission connect by pinions 16 and 17 to the bull gear 18 which drives the power output or propeller shaft 19. Additional gearing may be provided between the gear 18 and shaft 19, but since this is immaterial to the invention, it is not shown. The power input shafts drive the pinions 16 and 17 through the propeller clutches 20 and 21 which disengage in response to reverse torque transmission as occurs on the failure or shutdown of an engine. The gear 30 on the drive shaft 31 of the starter motor 32 meshes with the idler gears 33 and 34 to drive the gears 35 and 36 which have an overrunning connection with the power input shafts 14 and 15 through starter clutches 37 and 38. The starter drive shaft 31 is provided with a coupling 39 that disengages the propeller brake 40 when the engines are started. This propeller brake connects by pinion 41 to the bull gear 18.

The propeller clutches 20 and 21 are alike and the starter clutches 37 and 38 are alike, so only the details of the clutches for the left engine will be described. In the illustrated embodiment of the invention, the propeller end of the power plant is referred to as the front end and the right and left engines are identified by viewing the power plant from the anti-propeller or turbine end. The directions of rotation of the engines and starter are counterclockwise (viewed from the turbine end) resulting in a clockwise rotation of the propeller. The transmission of torque from either engine is noted as positive while the absorption of torque is noted as reverse or negative.

Figure 2:
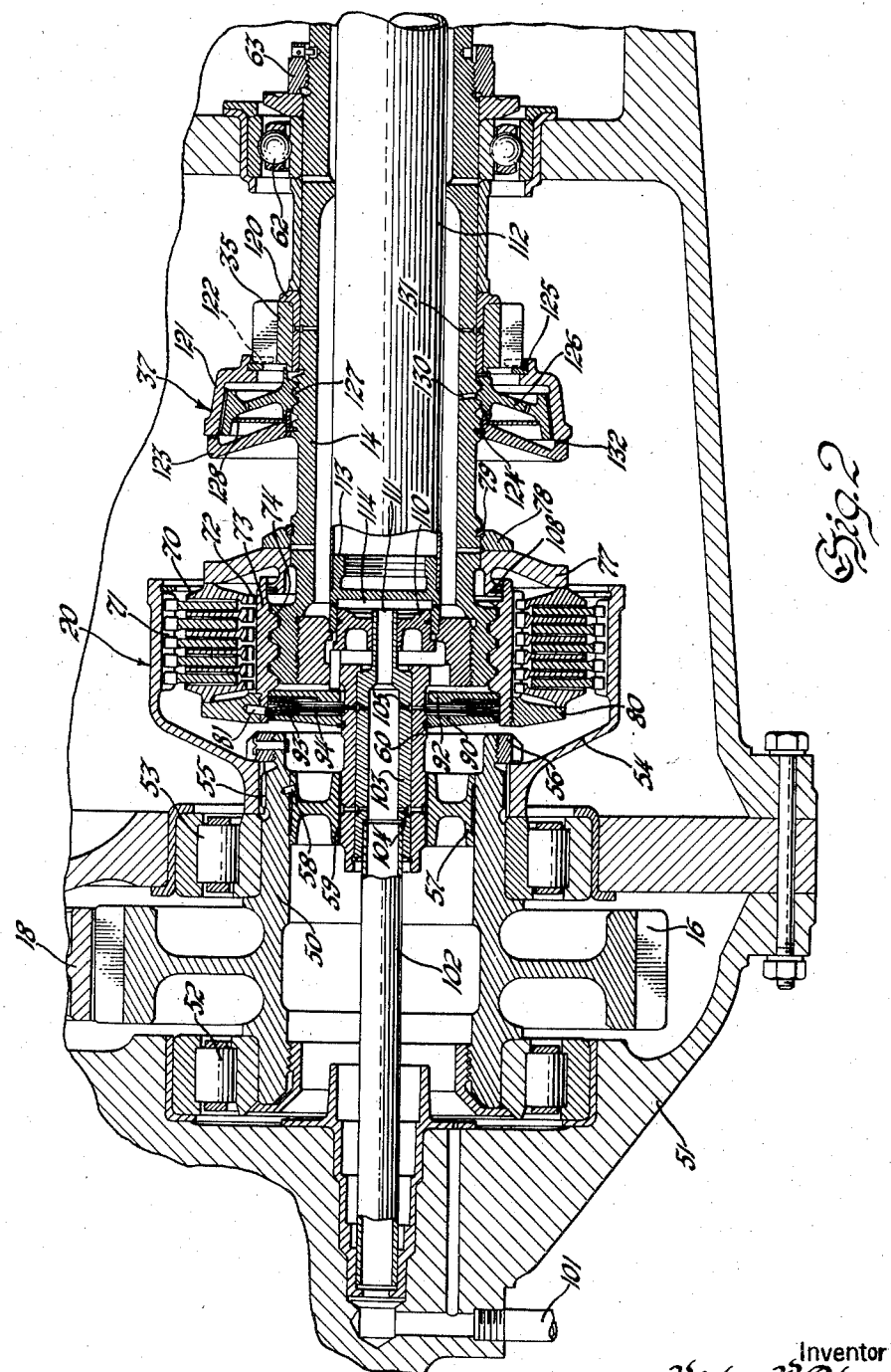
Fig. 2 is a partial sectional view taken along the axis of the left power unit particularly illustrating the clutching mechanisms of the unit.

Referring now to Figs. 2 and 4 for details of the clutches 20 and 37 of the left engine, the hub 50 of the left pinion 16 that meshes with the bull gear 18 is journaled for rotation in the frame 51 of the transmission by the roller bearings 52 and 53. The drum 54 of the clutch 20 is splined at 55 to the hub for rotation therewith, and the drum is restrained from axial movement by a spanner nut 56. A sleeve 57 is keyed at 58 to the interior of the hub 50 and provides a bearing surface 59 for the stub shaft portion of an end plug 60 that threads at 61 to the interior of the hollow input shaft 14 for rotation therewith. The input shaft 14 is additionally journaled for rotation in the frame 51 by a pair of axially spaced ball bearings, the front one of which is seen at 62 and is restrained against axial movement by suitable means including the threaded member 63.

The propeller clutch 20 consists basically of a plurality of axially movable friction disks 70 that are splined alternately at 71 and 72 to the inner circumference of the drum 54 and the outer circumference of the clutch actuating sleeve 73 for respective rotation therewith. The illustrated embodiment is designed to transmit over 3,000 H. P. at speeds in excess of 14,000 R. P. M. The clutch actuating sleeve 73 is mounted on the input shaft 14 by the left-hand helical splines 74 that includes internal threads formed in the sleeve and external threads formed on the shaft. An annular anchor plate 77 and a collar 78 are mounted on the input shaft 14 and are secured against rearward axial movement by a C-ring 79 which is received in an annular groove in the shaft.

When positive torque is transmitted from the input shaft to the pinion 16, a proportional axial force is generated by the left-hand helical splines 74 that winds the clutch actuating sleeve 73 toward the anchor plate 77. The friction disks 70 are thereby pressed together by the anchor plate 77 and the annular flange 80 that is threaded and keyed at 81 to the sleeve 73 so that the positive torque is transmitted through the clutch. The helical splines 74 are of suitable helix angle (50 degrees in the illustrated embodiment) to prevent slip during positive torque application.

An annular reaction plate 90 is journaled on the stub shaft portion of the end plug 60 and is secured against forward axial movement by a C-ring 91 which is received in an annular groove in the shaft. The reaction plate 90 is reciprocally and rotatably received in the cylindrical interior of the clutch actuating sleeve 73. An annular piston plate 92 and four Belleville spring washers 93 are supported by the cylindrical interior of the clutch actuating sleeve. The piston plate 92 is pressed against the forward end of the splined sleeve 73 by the Belleville springs 93 which anchor on the reaction plate 90 to load the clutch actuating sleeve 73 to place the disks 70 in frictional engagement for clutch energization by the helical splines 74. The Belleville springs 93 supply the loading when the power plant is initially started from dead rest and a hydraulic force (as described below) in the expansible chamber 94 defined by the sleeve 73 and plates 90 and 92 provides a loading or anti-loading while the power plant is operative. Practically all of the clutching force is generated by the helical splines and the spring and hydraulic loadings supply a relatively small "teasing" force to effect full clutch energization by the splines. The hydraulic anti-loading overcomes the "teasing" force under certain conditions so that practically all frictional drag between the disks will be eliminated.

A pump 100 (Fig. 3) is suitably driven by the power output shaft 19 and supplies system oil through the conduit 101 and the rotatably pipe 102 to the interior of the bushing 103 that is secured in the stub shaft portion of the end plug 60. The radial passages 104 in the bushing and stub shaft direct oil to the bearing surface 59 while the radial passages 105 direct oil into the expansible chamber 94. The expansible chamber 94 fills with oil and the centrifugal force generated by the oil loads the friction disks 70 during input shaft rotation. Oil is supplied to the expansible chamber 94 as long as there is rotation of the output shaft driven pump 100 and the oil overflows the inner rim of the piston plate 92 to lubricate the helical splines 74 and to cool and lubricate the engaging surfaces of the friction disks 70 when the clutch is engaged and disengaged. The clutch actuating sleeve 73 is provided with a plurality of radial passages 106 that direct the cooling oil between the friction disks. A flange 107 on the anchor plate 77 extends into the interior of the clutch actuating sleeve 73 and mounts a ring seal 108 that engages the rearward non-splined portion of the sleeve so that the cooling oil may escape only by way of the radial passages 106. The oil exhausting from the drum 54 collects in the sump of the transmission casing 51 and is continually recirculated by the pump 100.

A piston 110 is slidably mounted on the tubular extension 111 of the bushing 103 to release the loading by the spring washers 93 after the power plant has been started. A pipe 112 secures a plug 113 in the rearward end of the plug 60 for rotation with the input shaft. The interior of the plug 113 serves as a cylinder 114 for the piston 110. After the power plant is started, the pump 100 supplies oil at substantially constant system pressure to the cylinder 114 to urge the piston forward to oppose the Belleville springs 93. Three slidable pins 115 (only one of which is shown) transmit axial force between the piston 110 and the piston plate 92. The system oil pressure is such that the piston 110 will transmit a forward force to the piston plate 92 in excess of the rearward force transmitted by the Belleville springs 93 so that the loading of the clutch actuating sleeve 73 during normal operation depends upon the centrifugal hydraulic head of the oil in the expansion chamber 94. The size of the chamber 94 is such that the rearward force on the piston plate 92 from the centrifugal loading and the spring loading is greater than the forward force from the system oil pressure anti-loading at normal engine speeds but less at low engine speeds.

When the power plant is in operation and one of the engines fails or is shut down, the reverse torque through the inoperative engine's clutch unwinds the helical splines 74 in a forward direction to separate the friction disks 70 and the clutch slips when the reverse torque overcomes the net forward loading on piston plate 92 which is preferably such that the clutch will slip whenever a substantial amount of reverse torque is transmitted. The operative engine's clutch remains engaged so the system oil pressure continues to oppose the centrifugal loading and the spring loading of the inoperative engine's clutch. The centrifugal loading of the inoperative engine's clutch decreases as the inoperative engine slows down, and at a suitable low speed the system oil pressure overcomes both the centrifugal and spring loading thereby relieving the power plant of drag from the inoperative engine which may then come to rest free of the operative engine. If the inoperative engine is restarted, the clutch begins to re-engage when a sufficiently high engine speed is reached for the system oil anti-loading to be overcome by the combined spring and centrifugal loading. Full clutch engagement is effected by the helical splines at normal engine speed and power delivery. The inoperative engine may be restarted by energizing the starter motor 32 (Fig. 1) and/or by windmilling the engine if there is sufficient flight speed.

When making an initial start, i. e., when the propeller is stationary and both of the engines are started simultaneously, there is no system oil pressure and the spring loading effects clutch energization immediately, the spring creating sufficient friction to cause full engagement by the axial thrust of the helical splines 74. Ground starts of the entire power plant are accomplished by energizing the starter motor to supply power simultaneously to both of the engines, while air starts may be accomplished with or without the aid of the starter motor by unfeathering the propeller and air windmilling the engines. The overrunning starter clutches 37 and 38 are incorporated in the starter drive to the engines so that the engines may be started simultaneously from a single starter motor. In the event that one engine becomes operative prior to the other, the starter motor will continue to power the other engine until it becomes operative.

The starter clutch 37 is installed on the input shaft 14 rearward of the engine clutch 20. The gear 35 (which is driven by the starter gear 30 through the left idler gear 33) is freely rotatable on the bearing sleeve 120 on the shaft 14. A drum 121 having a conical friction surface in its interior is splined to the teeth of the gear 35 at 122. An annular plate 123 is journaled on the input shaft 14 with its rim in abutting relation with forward face of the rim of the drum 121. The drum 121 and the plate 123 are restrained against axial movement by the C-rings 124 and 125. An annular clutch shoe 126 is mounted on the input shaft 14 by the right-hand helical splines 127 (which are of 60 degree angle in the illustrated embodiment). A spring washer 128 loads the clutch shoe 126 for clutch energization by the helical splines 127. When torque is transmitted from the starter motor to the drum 121 the rearward axial force generated by the helical splines 127 maintains engagement between the drum 121 and the shoe 126 to start the engine. When the engine becomes operative, the reverse torque through the helical splines 127, unwinds the clutch shoe 126 away from the drum 121 so that overrunning occurs between the friction surfaces. The spring washer 128 is relatively weak so that drag between the shoe 126 and the drum 121 is insignificant.

Bleed holes 129 in the cylinder 114 of the engine clutch 20 meter system oil to the interior of the input shaft 14. The oil flows along the inner circumference of the input shaft and out of the radial passages 130 and 131 to lubricate the helical splines 127 and the bearing sleeve 120. The oil also cools the friction surfaces of the drum 121 and the shoe 126 and exhausts from the starter clutch through the radial grooves 132 that are formed in the rearward face of the annular plate 123.

Figure 3:
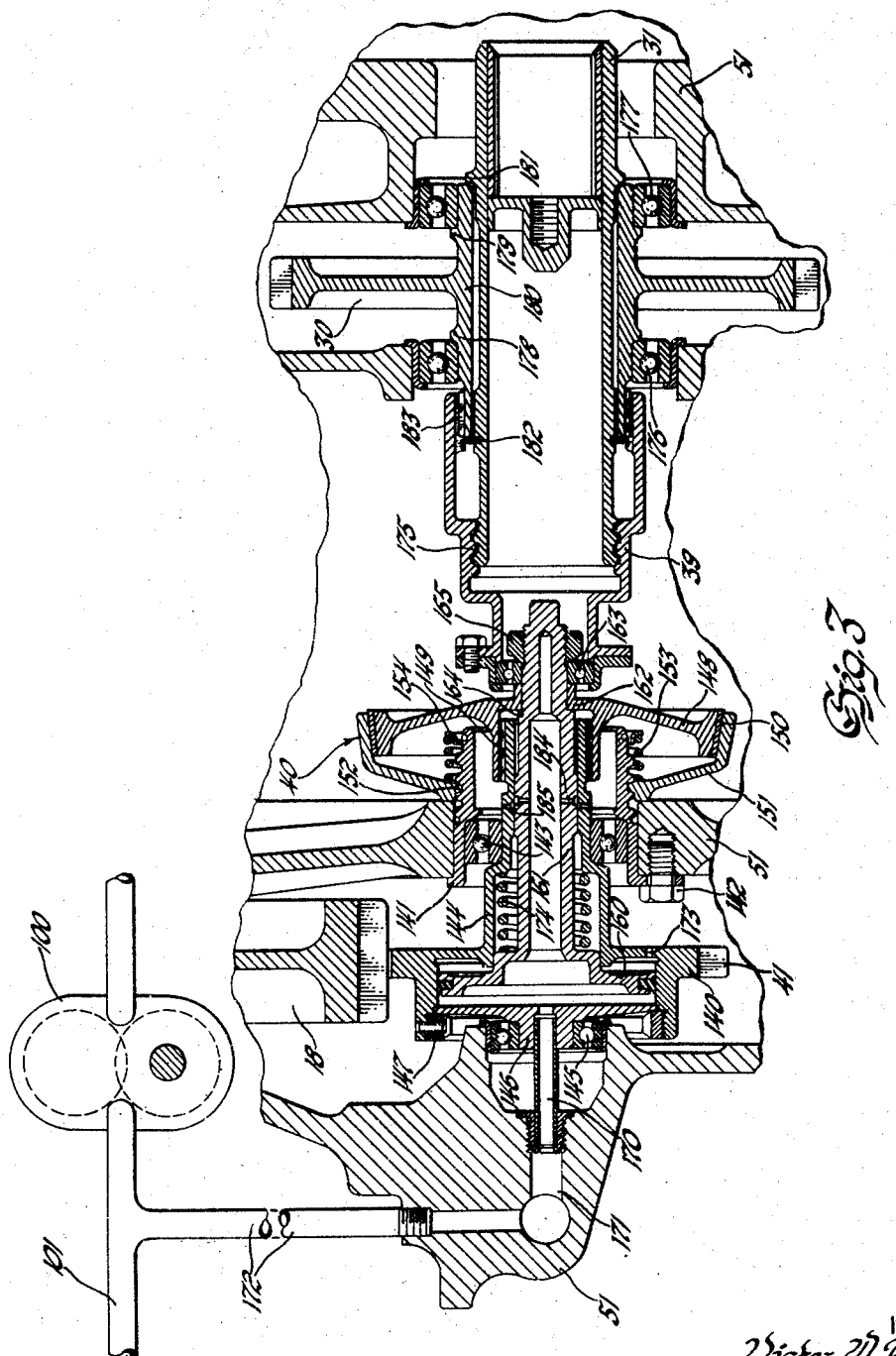
Fig. 3 is a partial sectional view taken along the axis of the starting and braking units particularly illustrating their coaction.

Referring now to Fig. 3, the propeller brake 40 is released as long as the power plant is operative and engages as the engines and propeller come to rest on shutdown. Ground shutdowns are accomplished by cutting off the fuel to the engines and flight shutdowns are effected by feathering the propeller and closing the compressor air intakes in addition to fuel cutoff. The brake prevents windmilling of the power plant in either direction while shut down and releases automatically as the power plant is started.

The bull gear 18 meshes with the external gear 41 of the brake cylinder 140 to drive the same during power plant operation. A support tube 141 is fixed to the transmission frame 51 by ears and bolts, as at 142, and mounts a bearing 143 that journals the integral sleeve 144 of the brake cylinder 140 for rotation. A bearing 145 journals the forward portion of the brake cylinder 140 through an annular plate 146 that is secured to the cylinder by a threaded ring 147. The bearings 143 and 145 prevent axial movement of the brake cylinder 140 but permits its rotation by the bull gear 18. A disk 148 is tied to the sleeve 144 for rotation therewith by the splines 149 that permit axial movement of the disk. The disk 148 is provided with a conical brake shoe 150 that engages the conical brake drum 151. The brake drum 151 is mounted on the support tube 141 by the right-hand helical splines 152 which are of suitable angle and is urged forwardly into engagement with the frame 51 by a coil spring 153 that abuts against the anchored washer 154 on the tube. An annular brake operating piston 160 reciprocably received in the interior of the brake cylinder 140 is provided with an integral hollow stem 161 that extends through the sleeve 144 of the cylinder. The hub 162 of the disk 148 and the bearing 163 of the coupling 39 are retained against the annular shoulder 164 of the stem 161 by a nut 165.

A rotatable slip tube 170 connects the brake cylinder plate 146 with the passage 171 in the frame 51 to lead system oil from the conduit 172 of the pump 100 into the brake cylinder 140. The system oil acts against the forward face of the brake operating piston 160 to keep the brake shoe 150 disengaged from the brake drum 151 during normal propeller rotation. A vent hole 173 in the rear wall of the brake cylinder 140 prevents oil entrapment behind the piston. The system oil pressure falls with decreasing propeller rotation and a coil spring 174 then acts against the rearward face of the brake operating piston 160 to engage the brake shoe 150 with the brake drum 151 when the power plant is shut down. The spring 174 is opposed during power plant operation by the system oil pressure and also by the centrifugal oil pressure that results from the rotation of the brake cylinder 140. The spring force on the piston is substantially less than the force on the piston from the centrifugal oil pressure in the engine operating speed range to prevent engagement of the brake shoe 150 and the brake drum 151 in the event of a loss of system oil pressure.

The spring 174 provides a yielding brake engaging force that prevents windmilling in a normal direction of an inoperative power plant. The brake engaging force of the spring is normally overcome during either air or ground starts through the reaction of the left-hand helical splines 175 (which are of 30 degree angle in the illustrated embodiment) that connect the starter drive shaft 31 with the coupling 39. An air start may be made without starter assistance at high aircraft speeds, however, by unfeathering the propeller and opening the air intakes to the engines to windmill the power plant with enough force to overcome the drag between the brake shoe and drum.

Reverse rotation of the power plant is absolutely prevented under any condition by the reaction of the right-hand helical splines 152 which wind the brake drum 151 away from its normal abutment with the frame 51 into tighter engagement with the brake shoe 150 at the slightest amount of reverse rotation.

The starter drive shaft 31 and the starter drive gear 30 are supported for rotation in the frame 51 by the bearings 176 and 177. The inner races of the bearings engage the annular shoulders 178 and 179 of the hub 180 of the gear 30 to prevent axial movement of the gear. The starter shaft 31 is coaxially received in the hub 180 and an annular shoulder 181 and a C-ring 182 on the shaft engage the end faces of the hub to prevent axial movement of the shaft. The splines 183 interconnect the hub 180 with the coupling 39 that connects through the left-hand helical splines 175 to the starter shaft 31.

When the starter motor 32 is energized the coupling 39 is shifted rearwardly by the helical splines 175 and overcomes the spring 174 to disengage the brake 40. The drive from the starter motor is then transmitted to both of the engines through the straight splines 183 of the coupling. The system oil presure will maintain brake disengagement when the power plant becomes operative so that the starter motor may be deenergized. The bearing 163 between the coupling 39 and the bull gear driven portions of the brake 40 and the starter clutches 37 and 38 permit the power plant to run free of the starter motor.

The propeller brake 40 is cooled during brake engagement by a metered flow of system oil out of the radial oil holes 184 and 185 which are located in the stem 161 of the piston 160 and the sleeve 144 of the brake cylinder 140 and which are in alignment when the brake is engaged. When the brake is disengaged the holes are out of alignment and the oil flow is stopped.

The invention simplifies the supervision of the braking and clutching apparatus of the power plant by the pilot by automatically controlling the appartus in accordance with the manner in which the power plant is operated, i. e., the apparatus is subservient to the operating conditions existent in the propeller and the engines rather than to direct manual control. The invention provides for simpler and safer operation of either single or plural engine arrangements in the art of aircraft propulsion and the principles of the invention may easily be utilized in other arts through the use of ordinary skill.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:

1. A mechanism for coupling a first shaft and a second shaft comprising, in combination, a sleeve helically splined to said first shaft, interleaving clutch disks alternately connected to said sleeve and said second shaft for clutching engagement with one another when said sleeve shifts in a first axial direction and for disengagement with one another when said sleeve shifts in a second axial direction opposite said first direction, said helically splined connection serving to increase said clutching engagement when said first shaft powers said second shaft and to decrease said clutching engagement when said second shaft powers said first shaft, a hydraulic motor on said first shaft including relatively movable members secured respectively to said first shaft and said sleeve and forming an annular chamber therewith that is expansible to move said sleeve in said first direction, means acting on said movable member secured to said sleeve to move said sleeve in said second direction, a spring in said chamber urging its expansion at all times, and a liquid in said chamber centrifugally urging its expansion in accordance with the speed of said first shaft.

2. A mechanism for coupling a first shaft and a second shaft comprising, in combination, means for supplying a fluid under pressure, a sleeve helically splined to said first shaft, interleaving clutch disks alternately connected to said sleeve and said second shaft for clutching engagement with one another when said sleeve shifts in a first axial direction and for disengagement with one another when said sleeve shifts in a second axial direction opposite said first direction, said helically splined connection serving to increase said clutching engagement when said first shaft powers said second shaft and to decrease said clutching engagement when said second shaft powers said first shaft, a reaction member on said first shaft, a reaction member on said sleeve, means acting between said reaction members urging said sleeve in said first direction at all times, a cylinder in said first shaft having a piston therein, said piston being actuated by said fluid to move said sleeve in said second direction and overpower said second mentioned means whenever the speed of said first shaft falls greatly below the speed of said second shaft.

3. A mechanism for coupling a first shaft and a second shaft comprising, in combination, means for supplying a fluid at substantially constant pressure during second shaft rotation, a sleeve helically splined to said first shaft, interleaving clutch disks alternately connected to said sleeve and said second shaft for clutching engagement with one another when said sleeve shifts in a first axial direction and for disengagement with one another when said sleeve shifts in a second axial direction opposite said first direction, said helically splined connection serving to increase said clutching engagement when said first shaft powers said second shaft and to decrease said clutching engagement when said second shaft powers said first shaft, a hydraulic motor on said first shaft including relatively movable members secured respectively to said first shaft and said sleeve and forming an annular chamber therewith that is expansible to move said sleeve in said first direction and contractible to move said sleeve in said second direction, a spring in said chamber urging its expansion at all times, a liquid in said chamber centrifugally urging its expansion in accordance with the speed of said first shaft, and a cylinder in said first shaft having a piston therein actuated by said fluid for opposing said chamber expansion during second shaft rotation, said piston being operative to contract said chamber when said first shaft speed falls greatly below the speed of said second shaft.

4. A power transmission unit comprising a power input shaft, a power output shaft, a normally engaged clutch connecting the shafts, a brake for the output shaft, means actuated by output shaft rotation to oppose brake engagement, means responsive to input shaft rotation to aid clutch engagement, means actuated by output shaft rotation to oppose clutch engagement, and means responsive to torque flow through the clutch to vary the clutching force.

5. A power transmission unit comprising a power input shaft, a power output shaft, a brake for the output shaft, a third shaft for driving the input shaft, means operated by initial rotation of the third shaft to release the brake, and means actuated by output shaft rotation to maintain the brake released.

6. A power transmission unit comprising a power input shaft, a power output shaft, a brake for the output shaft, a normally engaged clutch connecting the input and output shafts, a third shaft for driving the input shaft, cam means driven by the third shaft to release the brake, means actuated by output shaft rotation to maintain the brake released, and means actuated by rotations of the input and output shafts to control the clutch.

7. A power plant comprising an engine, a power output shaft coupled to the engine, a brake for the power output shaft, a starter for the engine, means actuated by initial rotation of the starter to release the brake when the starter is energized, and means to maintain the brake released when the power plant is operative.

8. A power plant comprising an engine, a power output shaft coupled to the engine, a brake for the power output shaft, a starter for the engine, a helically splined coupling between the starter and the brake to release the brake when the starter is energized, and means driven by the power output shaft to maintain the brake released.

9. A power plant comprising an engine, a power output shaft coupled to the engine, a brake for the power output shaft, a starter for the engine, cam means driven by the starter to release the brake when the starter is energized, means driven by the power output shaft for supplying fluid under pressure, and means actuated by the fluid under pressure to maintain the brake released.

10. A power plant comprising a power output shaft, a brake for the power output shaft, an engine, a clutch connecting the engine to the power output shaft, a starter for the engine, means to release the brake when the starter is energized, means to maintain clutch engagement while the engine powers the power output shaft, and means driven by the power output shaft to maintain the brake released.

11. A power plant comprising a power output shaft, a normally engaged brake for the power output shaft, an engine, a normally engaged clutch connecting the engine to the power output shaft, a starter, a normally engaged clutch connecting the starter to the engine, and automatic means to release the brake as the starter is energized and to release the second mentioned clutch as the engine becomes operative.

12. A power plant comprising a power output shaft, a normally engaged brake for the power output shaft, an engine, a normally engaged clutch connecting the engine to the power output shaft, a starter, a normally engaged clutch connecting the starter to the engine, automatic means to release the brake as the starter is energized and to release the second mentioned clutch as the engine becomes operative, and means driven by the power output shaft to maintain the brake released.

13. A power plant comprising a power output shaft, a normally engaged brake connected to the power output shaft, an engine, a normally engaged clutch connecting the engine to the power output shaft, a starter, a normally engaged clutch connecting the starter to the engine, means actuated by starter energization to release the brake, means actuated by power output shaft rotation to maintain the brake released, means actuated by rotations of the engine and of the power output shaft to control the first mentioned clutch, and automatic means to disengage the second mentioned clutch when the engine becomes operative.

14. An aircraft propulsion unit comprising a propeller, an engine, a clutch connecting the engine to the propeller, resilient means urging clutch engagement, hydraulic means urging clutch engagement in response to engine speed, hydraulic means to oppose both of said means during propeller rotation, and means responsive to torque flow through the clutch to increase the clutching force when the engine drives the propeller and to decrease the clutching force when the propeller drives the engine.

15. An aircraft propulsion unit comprising a propeller, an engine, a clutch connecting the engine to the propeller, resilient means to engage the clutch, means responsive to engine speed to engage the clutch, an oil pump driven by the propeller to supply oil under pressure to overpower both of said means, and means responsive to torque flow through the clutch to increase the clutching force when the engine powers the propeler and to decrease the clutching force when the propeller powers the engine.

16. An aircraft propulsion unit comprising a propeller, an engine, a clutch connecting the engine to the propeller, resilient means to engage the clutch, hydraulic means to engage the clutch comprising a liquid containing expansible chamber rotated by the engine, hydraulic means to oppose both of said means comprising a pump driven by the propeller, and means responsive to torque flow through the clutch to increase the clutching force when the engine powers the propeller and to decrease the clutching force when the propeller powers the engine comprising a helically splined coupling between the clutch and engine.

17. An aircraft propulsion unit comprising a propeller, a brake connected to the propeller to prevent windmilling, an engine, a clutch connecting the engine to the propeller, means to release the brake, and means actuated by rotations of the engine and the propeller to control the clutch.

18. An aircraft propulsion unit comprising a propeller, an engine coupled to the propeller, a normally engaged brake for the propeller, a starter for the engine, and cam means driven by the starter to release the brake when the starter is energized.

19. An aircraft propulsion unit comprising an engine, a starter for the engine, a propeller, a clutch connecting the engine and the propeller, automatic means for engaging the clutch except when the engine is inoperative and the propeller is operative, automatic means for braking the propeller when the propeller is inoperative to prevent windmilling of the propeller, and automatic means for releasing the propeller braking means when the starter is energized.

20. An aircraft propulsion unit comprising a propeller, a brake for the propeller to prevent windmilling, an engine, a propeller clutch connecting the engine and the propeller, a starter motor, a starter clutch connecting the starter motor and the engine, and automatic means for releasing the brake when the starter is energized, disengaging the starter clutch when the engine becomes operative, and disengaging the propeller clutch when the engine becomes inoperative during propeller rotations.

21. An aircraft propulsion unit comprising a propeller, a pair of gas turbine engines connected to the propeller, a common starter for simultaneously powering both engines, and an automatic clutch between each engine and the starter to release each engine from the starter as the engine becomes operative.

22. An aircraft propulsion unit comprising a propeller, a pair of gas turbine engines, a torque responsive clutch between each engine and the propeller, a starter, and a torque responsive clutch between each engine and the starter.

23. An aircraft propulsion unit comprising a pair of gas turbine engines each connecting to a common propeller and to a common starter, a brake for the propeller to prevent windmilling, and cam means driven by the starter to release the brake when the starter is energized.

24. An aircraft propulsion unit comprising a pair of gas turbine engines each connecting to a common propeller and to a common starter, a brake for the propeller to prevent windmilling, automatic means to release the brake when the starter is energized, and automatic means to release each engine from the starter as the engine becomes operative.

25. An aircraft propulsion unit comprising a propeller having a brake to prevent windmilling, a pair of gas turbine engines having a common starter, each engine having a propeller clutch and a starter clutch, automatic means for releasing the brake when the starter is energized, automatic means for disengaging each starter clutch when its engine becomes operative, and automatic means for disengaging each propeller clutch when its engine becomes inoperative during propeller rotation.

26. A power transmission unit comprising a power input shaft, a power output shaft, a clutch connecting the shafts, fluid pressure means responsive to input shaft speed to engage the clutch, fluid pressure means responsive to output shaft rotation to oppose clutch engagement, and means responsive to torque flow through the clutch to vary the clutching force.

27. A power transmission unit comprising a power input shaft, a power output shaft, a clutch connecting the power input shaft to the power output shaft, fluid pressure means responsive to rotations of the shafts to apply and release the clutch, and means responsive to torque flow through the clutch to make the clutch self-energizing when the input shaft powers the output shaft and non-self-energizing when the output shaft powers the input shaft.

28. A power transmission unit comprising a power input shaft, a power output shaft, a clutch connecting the shafts, resilient means to engage the clutch, fluid pressure means responsive to input shaft speed to engage the clutch, fluid pressure means responsive to output shaft rotation to oppose both of said means, and means responsive to torque flow through the clutch to increase the clutching force when the input shaft powers the output shaft and to decrease the clutching force when the output shaft powers the input shaft.

References Cited in the file of this patent

UNITED STATES PATENTS

| | | |
|---|---|---|
| 936,190 | Tuckfield | Oct. 5, 1909 |
| 1,841,284 | Gillett | Jan. 12, 1932 |
| 1,883,331 | Bijur | Oct. 18, 1932 |
| 1,937,234 | Lansing | Nov. 28, 1933 |
| 2,023,690 | Lyman | Dec. 10, 1935 |
| 2,180,599 | Menasco | Nov. 21, 1939 |
| 2,301,930 | Cattaneo | Nov. 17, 1942 |
| 2,344,083 | Freitag et al. | Mar. 14, 1944 |
| 2,609,707 | Marchant | Sept. 9, 1952 |
| 2,690,245 | Krueger | Sept. 28, 1954 |

FOREIGN PATENTS

| | | |
|---|---|---|
| 612,652 | Great Britain | Nov. 16, 1948 |